(12) United States Patent
Jang et al.

(10) Patent No.: US 8,693,396 B2
(45) Date of Patent: Apr. 8, 2014

(54) METHOD AND APPARATUS FOR ALLOWING A SUBSCRIBER TO VIEW THE CALLING PARTY NUMBER FOR A CIRCUIT SWITCHED VOICE CALL PAGE WHILE ATTACHED TO A PACKET DATA NETWORK

(75) Inventors: Ke-Chi Jang, Plano, TX (US); Marvin Bienn, Dallas, TX (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 271 days.

(21) Appl. No.: 13/152,798

(22) Filed: Jun. 3, 2011

(65) Prior Publication Data
US 2011/0299491 A1    Dec. 8, 2011

Related U.S. Application Data

(60) Provisional application No. 61/352,559, filed on Jun. 8, 2010.

(51) Int. Cl.
*H04Q 7/00* (2006.01)
*H04L 12/66* (2006.01)

(52) U.S. Cl.
USPC .......................................... 370/328; 370/352

(58) Field of Classification Search
USPC ............... 370/328, 338, 352–356, 395.2, 401
See application file for complete search history.

(56) References Cited

U.S. PATENT DOCUMENTS

| | | | |
|---|---|---|---|
| 6,477,373 B1* | 11/2002 | Rappaport et al. | 455/436 |
| 7,319,861 B2* | 1/2008 | Benco et al. | 455/414.1 |
| 7,706,336 B2* | 4/2010 | Sheynman et al. | 370/338 |
| 7,983,242 B2* | 7/2011 | Nasielski et al. | 370/352 |
| 8,369,336 B2* | 2/2013 | Song et al. | 370/395.2 |
| 2005/0041597 A1* | 2/2005 | Wang et al. | 370/252 |
| 2007/0072627 A1 | 3/2007 | Liu | |
| 2008/0056236 A1* | 3/2008 | Barclay et al. | 370/352 |
| 2008/0070498 A1 | 3/2008 | Tan et al. | |
| 2008/0248817 A1* | 10/2008 | Gao et al. | 455/458 |
| 2010/0049789 A1* | 2/2010 | Zhao | 709/203 |
| 2011/0164609 A1* | 7/2011 | Lee | 370/352 |

FOREIGN PATENT DOCUMENTS

CN    1849001 A    10/2006

\* cited by examiner

*Primary Examiner* — Hong Cho

(57) ABSTRACT

A single radio multimode mobile (SRMMM) of a circuit-switched radio access technology (RAT) network and a packet data radio access technology (RAT) network including a network interface unit attached to the packet data RAT network through which an active packet data session is maintained. The SRMMM includes a processing unit in communication with a network interface unit. The SRMMM includes a display on which the processing unit displays a calling party number associated with a circuit switched page request for a voice call. A method of allowing a subscriber of a single radio multimode mobile (SRMMM) of a circuit-switched radio access technology (RAT) network and a packet data radio access technology (RAT) network to view a calling party number including comprises the steps of attaching a network interface unit to the packet data RAT network through which an active packet data session is maintained. There is the step of displaying on a display a calling party number associated with a circuit switched page request for a voice call by a processing unit.

10 Claims, 4 Drawing Sheets

METHOD AND APPARATUS FOR ALLOWING A SUBSCRIBER TO VIEW THE CALLING PARTY NUMBER FOR A CIRCUIT SWITCHED VOICE CALL PAGE WHILE ATTACHED TO A PACKET DATA NETWORK

CROSS-REFERENCE TO RELATED APPLICATIONS

This application claims the benefit of U.S. Provisional Application No. 61/352,559, filed Jun. 8, 2010, the disclosure of which is incorporated herein by reference.

FIELD OF THE INVENTION

The present invention is related to allowing a subscriber of a single radio multimode mobile (SRMMM) of a circuit-switched radio access technology (RAT) network and a packet data RAT network to view a calling party number associated with a circuit switched page request for a voice call while attached to the packet data RAT network. (As used herein, references to the "present invention" or "invention" relate to exemplary embodiments and not necessarily to every embodiment encompassed by the appended claims.) More specifically, the present invention is related to allowing a subscriber of a single radio multimode mobile (SRMMM) of a circuit-switched RAT network and a packet data RAT network to view a calling party number associated with a circuit switched page request for a voice call while attached to the packet data RAT network where the calling party number is received with the circuit switched page request:

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

For existing cdma circuit-switched operations, the mobile station (MS) receiving a voice call request will only receive the calling party number (CPN) after the traffic channel has been established. The MS displays the CPN to the subscriber when the MS alerts the subscriber of the incoming voice call. Once alerted and the CPN is displayed, the subscriber can either accept or reject the voice call.

A single radio multi-mode mobile (SRMMM) is a mobile capable of supporting cdma circuit-switched operations over a circuit-switched RAT (e.g., 1×RTT) and packet-data operations over one or more packet-data radio access technologies (e.g., HRPD, eHRPD, LTE). A SRMMM can only be attached to one radio access technology at a time.

When a SRMMM (e.g., capable of cdma circuit-switched operation and packet-data operation on LTE) is attached to a packet-data RAT (e.g., LTE) it can receive cdma circuit-switched messaging using a specified tunneling protocol (e.g., Generic Circuit Services Notification Application (GC-SNA)). A common reason for tunneling cdma circuit-switched messaging to a SRMMM attached to a packet-data RAT is the subscriber's telephone number (associated with the SRMMM) is homed on a cdma circuit-switched network element (e.g., a Gateway MSC). A Gateway MSC that homes a subscriber's telephone number implies that all voice call request (e.g., an ISUP Initial Answer Message) from a PSTN (Public Switched Telephone Network) to that telephone number will be routed to the Gateway MSC. If a voice call request from a PSTN has been routed to a Gateway MSC, the Gateway MSC will in turn discovers the Serving MSC serving the SRMMM (associated with the subscriber telephone number) and will route the voice call request to the Serving MSC. Tunneling of cdma circuit-switched messaging (e.g., initiated by a Serving MSC) to a SRMMM attached to a packet-data RAT proves a trigger to the SRMMM to detach from the packet-data RAT and attach to the circuit-switched RAT for the purpose of accepting a voice call request that had been routed to the Serving MSC.

When the SRMMM, attach to a packet-data RAT, receives a tunneled cdma circuit-switched Page Request message the SRMMM detaches from the packet-data RAT and attached to a designated circuit-switch RAT. Once a circuit-switched traffic channel has been established, the SRMMM displays the calling party number to the subscriber when the SRMMM alerts the subscriber (e.g., with an audio tone) of an incoming voice call. Only at this point can the subscriber reject the voice call.

At the time of receiving a tunneled cdma circuit-switched Page Request message the SRMMM is attached to a packet-data RAT (e.g. LTE) and may be on a critical active packet data session. Current existing procedures require the SRMMM upon receives a tunneled cdma circuit-switched Page Request message (e.g., 1× Page Request message) to retune and attach to the 1×cdma circuit-switched RAT. The SRMMM is then assigned a 1× circuit-switched traffic channel. The calling party number (CPN) is displayed to the MS user only after the SRMMM has acquired the 1× circuit-switched traffic channel. Only after the CPN has been displayed to the MS user can the MS User accept or reject the 1× voice call.

With the existing procedure, any user determined critical packet-data application might be terminated (e.g., due to a time-out condition) since the mobile is no longer attached to the packet-data system from the reception of the 1× Page Request message until the MS user rejects the 1× voice call (based upon the CPN). It is also inconvenient and a waste of 1× traffic channel resources for the SRMMM to fall back to 1× circuit-switched RAT every time a tunneled 1× Page Request message is received to determine whether the MS user is going to accept or reject the voice call.

BRIEF SUMMARY OF THE INVENTION

The present invention pertains to a single radio multimode mobile (SRMMM) of a circuit-switched RAT network and a packet data RAT network. The SRMMM comprises a network interface unit attached to the packet data RAT network through which an active packet data session is maintained. The SRMMM comprises a processing unit in communication with a network interface unit. The SRMMM comprises a display on which the processing unit displays a calling party number associated with a circuit switched page-request for a voice call.

The present invention pertains to a method of allowing a subscriber of a single radio multimode mobile (SRMMM) of a circuit-switched RAT network and a packet data RAT network to view a calling party number. The method comprises the steps of attaching a network interface unit to the packet data RAT network through which an active packet data session is maintained. There is the step of displaying on a display a: calling party number associated with a circuit switched page request for a voice call by a processing unit.

The present invention allows the MS user to see the CPN contained within the tunneled cdma circuit-switched Page Request message while the mobile is still attached to the packet-data RAT.

The present invention allows the MS user, based upon the displayed CPN, to accept (implies the mobile will detach from the packet-data RAT and attach to the circuit-switch RAT for the purpose of setting up the voice call) or reject (implies the mobile will: stay attached to the packet-data RAT and the circuit-switched network would terminate the voice call) the tunneled cdma circuit-switched Page Request message.

BRIEF DESCRIPTION OF THE SEVERAL
VIEWS OF THE DRAWING

In the accompanying drawings, the preferred embodiment of the invention and preferred methods of practicing the invention are illustrated in which.

DETAILED DESCRIPTION OF THE INVENTION

Figure 1:
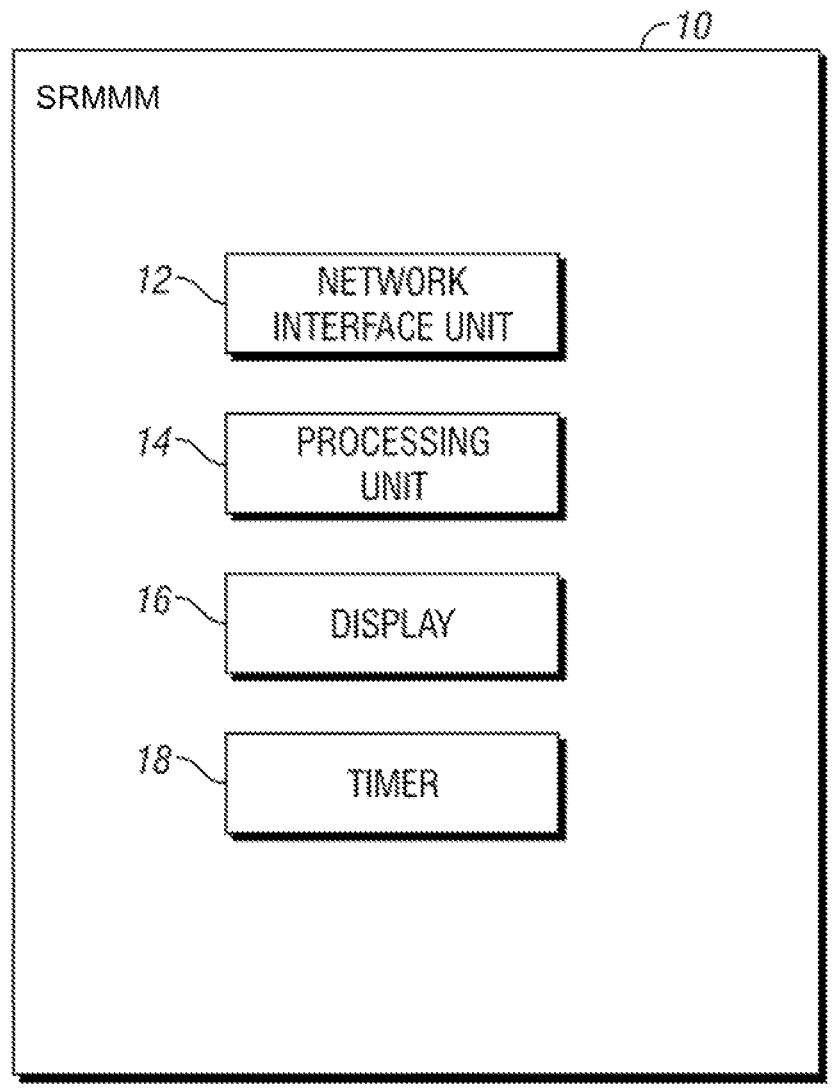
FIG. 1 is a block diagram of an SRMMM of the present invention.

Referring now to the drawings wherein like reference numerals refer to similar or identical parts throughout the several views, and more specifically to FIG. 1 thereof, there is shown a single radio multimode mobile (SRMMM) 10 of a circuit-switched RAT network and a packet data RAT network. The SRMMM 10 comprises a network interface unit 12 attached to the packet data RAT network through which an active packet data session is maintained and can also attach to a circuit switch RAT network. The SRMMM 10 comprises a processing unit 14 in communication with a network interface unit 12. The SRMMM 10 comprises a display 16 on which the processing unit 14 displays a calling party number associated with a circuit switched page request for a voice call.

The network interface unit 12 may receive the circuit switched page request, with the calling party number while the network interface unit 12 is attached to the packet data RAT network and the active packet data session is maintained. The processing unit 14 may accept the circuit switched page request for the voice call and causes the network interface unit 12 to detach from the packet data RAT network and terminate the packet data session and send a circuit switched page response to accept the voice call. The SRMMM 10 may include a timer 18 and wherein the processing unit 14 starts the timer 18 when the circuit-switched page message is received at the network interface unit 12 and the processing unit 14 stops the timer 18 when the processing unit 14 accepts the circuit switched page request. The processing unit 14 may instruct the network interface unit 12 to attach to the circuit switched network after the network interface unit 12 detaches from the packet data RAT network.

The processing unit 14 may cause the network interface unit 12 to send a message to the circuit switched network indicating that the circuit-switched page request with the calling party number is rejected while remaining attached to the packet data RAT network and while the packet data session is maintained. The SRMMM 10 may include a timer 18 and wherein the processing unit 14 starts the timer 18 when the circuit-switched page with the calling party number is received at the network interface unit 12 and the processing unit 14 stops the timer 18 when the processing unit 14 rejects the circuit switched page request.

The SRMMM 10 may include a timer 18 and wherein the processing unit 14 activates the timer 18 when the network interface unit 12 receives the circuit switched page request with the calling party number, and the processing unit 14 causes the network interface to send a message to the circuit switched network indicating that the circuit-switched page request with the calling party number is rejected after a predetermined period of time has expired and the processing unit 14 has not accepted the circuit-switched page request. Alternatively, the SRMMM 10 may include a timer 18 and wherein the processing unit 14 activates the timer 18 when the network interface unit 12 receives the circuit switched page request with the calling party number, and the processing unit 14 causes the network interface to send a message to the circuit switched network indicating that the circuit-switched page request is accepted after a predetermined period of time has expired and the processing unit 14 has accepted the circuit-switched page request.

The present invention pertains to a method of allowing a subscriber of a single radio multimode mobile (SRMMM) 10 of a circuit-switched RAT network and a packet data RAT network to view a calling party number. The method comprises the steps of attaching a network interface unit 12 to the packet data RAT network through which an active packet data session is maintained. There is the step of displaying on a display 16 a calling party number associated with a circuit switched page request for a voice call by a processing unit 14.

There may be the step of the network interface unit 12 receiving the circuit switched page request with the calling party number while the network interface unit 12 is attached to the packet data RAT network and suspends the one or more active packet data sessions is maintained. There may be the steps of the processing unit 14 accepting the circuit switched page request with the calling party number for the voice call and causing the network interface unit 12 to detach from the packet data RAT network and suspend the packet data session (s) and send a circuit switched page response to accept the voice call. There may be the steps of the processing unit 14 starting a tinier 18 when the circuit-switched page request with the calling party number is received at the network interface unit 12 and the processing unit 14 stopping the timer 18 when the processing unit 14 accepts the circuit switched page request. There may be step of the processing unit 14 instructing the network interface to attach to the circuit switched. RAT network after the network interface unit 12 detaches from the packet data RAT network.

There may be the step of the processing unit 14 causing the network interface unit 12 to send a message to the circuit switched network indicating that the circuit-switched page request with the calling party number is rejected while remaining attached to the packet data RAT network and while the packet data session is maintained. There may be the steps of the processing unit 14 starting a timer 18 when the circuit-switched page message with the calling party number is received at the network interface unit 12 and the processing unit 14 stopping the timer 18 when the processing-unit 14 rejects the circuit switched page request.

There may be the steps of the processing unit 14 activating a timer 18 when the network interface unit 12 receives the circuit switched page request with the calling party number, and the processing unit 14 causing the network interface to send a message to the circuit switched network indicating that the circuit-switched page request is rejected after a predetermined period of time has expired and the processing unit 14 has not accepted the circuit-switched page request. Alternatively, there may be the steps of the processing unit 14 activating a timer 18 when the network interface, unit 12 receives the circuit switched page request with the calling party number, and the processing unit 14 causing the network interface to send a message to the circuit switched network indicating that the circuit-switched page request is accepted after a predetermined period of time has expired and the processing unit 14 has accepted the circuit-switched page request.

In the operation of the invention, when the IWS (either collocated with a BSC or as an independent entity connection to BSC) receives a Paging Request with the calling party number from MSC, the IWS sends a tunneled cdma circuit-switched Page Request message and the CPN to the SRMMM 10 attached to a packet-data RAT indicating an incoming voice calls to the SRMMM 10.

Upon receiving the tunneled cdma circuit-switched page message (e.g., 1× Page Request) and the calling party number (CPN) the SRMMM 10 starts a timer 18 (referenced as $Timer_{PRD}$ in this document). $Timer_{PRD}$ starts only if the CPN is included with the tunneled 1× Page Request message. The processing unit 14 in the SRMMM 10 is enhanced to:
1) Display the CPN to the SRMMM user.
2) Stop the SRMMM from automatically attaching (as per the existing procedure today) to the circuit-switched RAT.
3) React to an explicit SRMMM user response to the display of the CPN.
   a. A SRMMM user acceptance response implies the SRMMM 10 will stop $Timer_{PRD}$. The SRMMM 10 sends a 1× Page Response to accept the voice call. Based upon SRMMM 10 capabilities, the SRMMM 10 will either:
      i. tunnel the 1× Page Response to the IWS, or
      ii. detach from the packet-data RAT, retunes to a circuit-switch RAT access channel and send the 1× Page Response to a 1× circuit-switched base station.
   b. A SRMMM user rejection response implies the SRMMM 10 stays attached to the packet-data RAT. The SRMMM 10 will stop $Timer_{PRD}$. The SRMMM 10 tunnels a message to the circuit-switched network, through the IWS, indicating that the SRMMM user rejects the 1× voice call.
4) Reject the 1× Page Request if the $Timer_{PRD}$ expires.
   a. The SRMMM 10 stays attached to the packet-data RAT. The SRMMM 10 tunnels a message to the circuit-switched network indicating that the MS user rejects the 1× voice call.
5) Accept the 1× Page Request if the $Timer_{PRD}$ expires.
   a. SRMMM 10 will either:
      i. tunnel the 1× Page Response to the IWS, or
      ii. detach from the packet-data RAT, retunes to a circuit-switch RAT access channel and send the 1× Page Response to a 1× circuit-switched base station.

Figure 2:
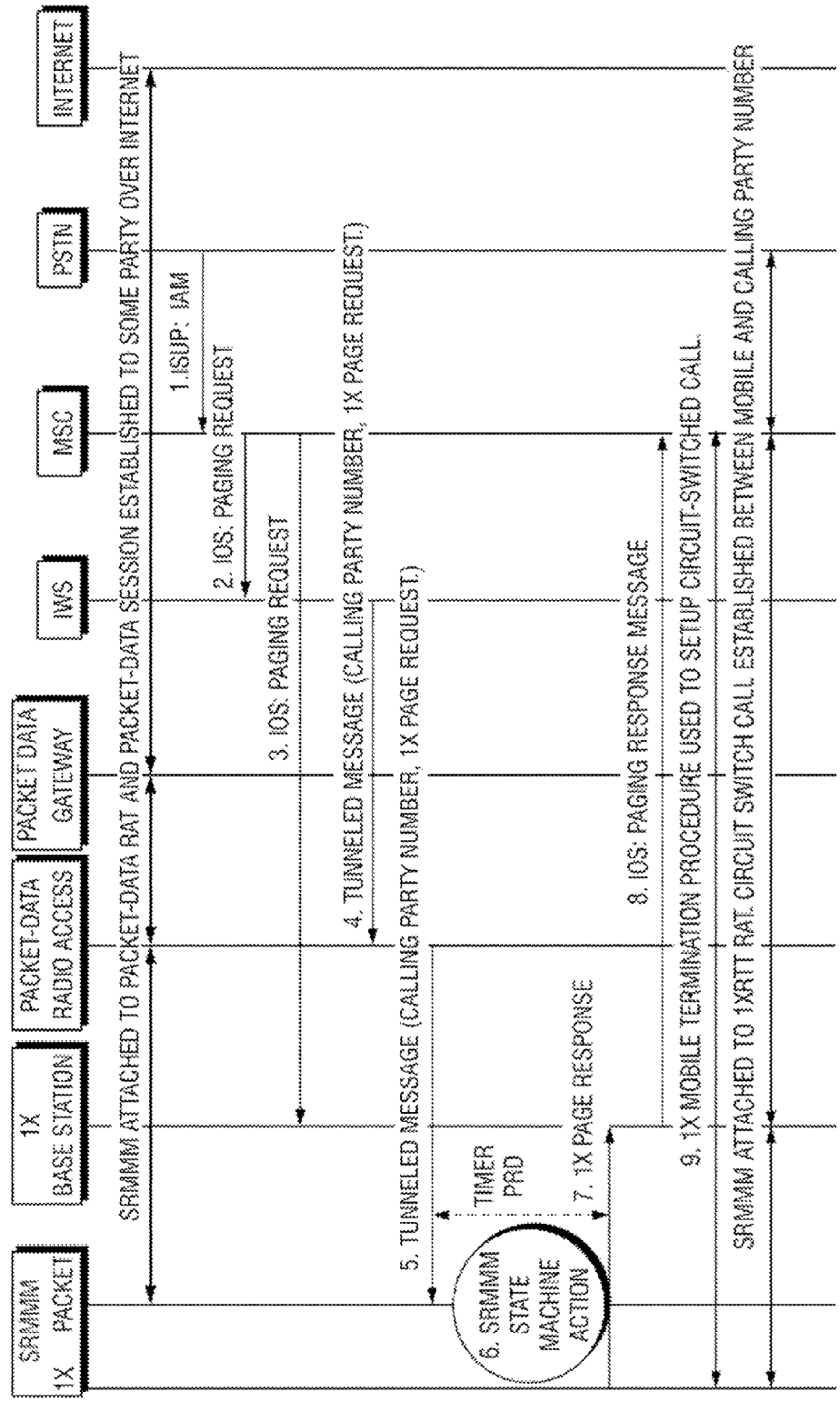
FIG. 2 shows the message sequence when the SRMMM accepts 1x voice call.

FIG. 2 shows the message sequence when the SRMMM 10 accepts 1× voice call.

Figure 3:
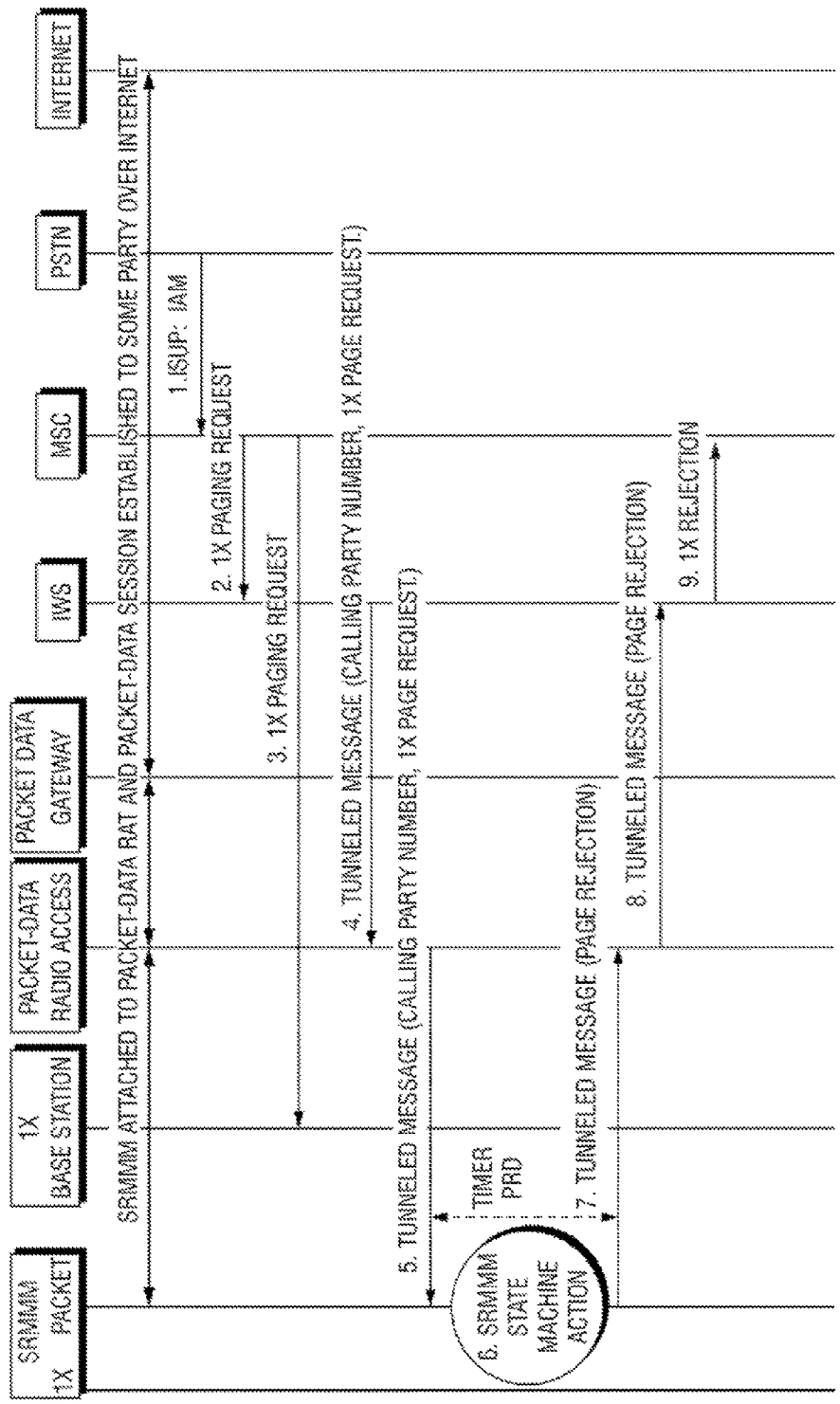
FIG. 3 shows the message sequence when the SRMMM rejects 1x voice call.

FIG. 3 shows the message sequence when the SRMMM 10 rejects 1× voice call.

Figure 4:
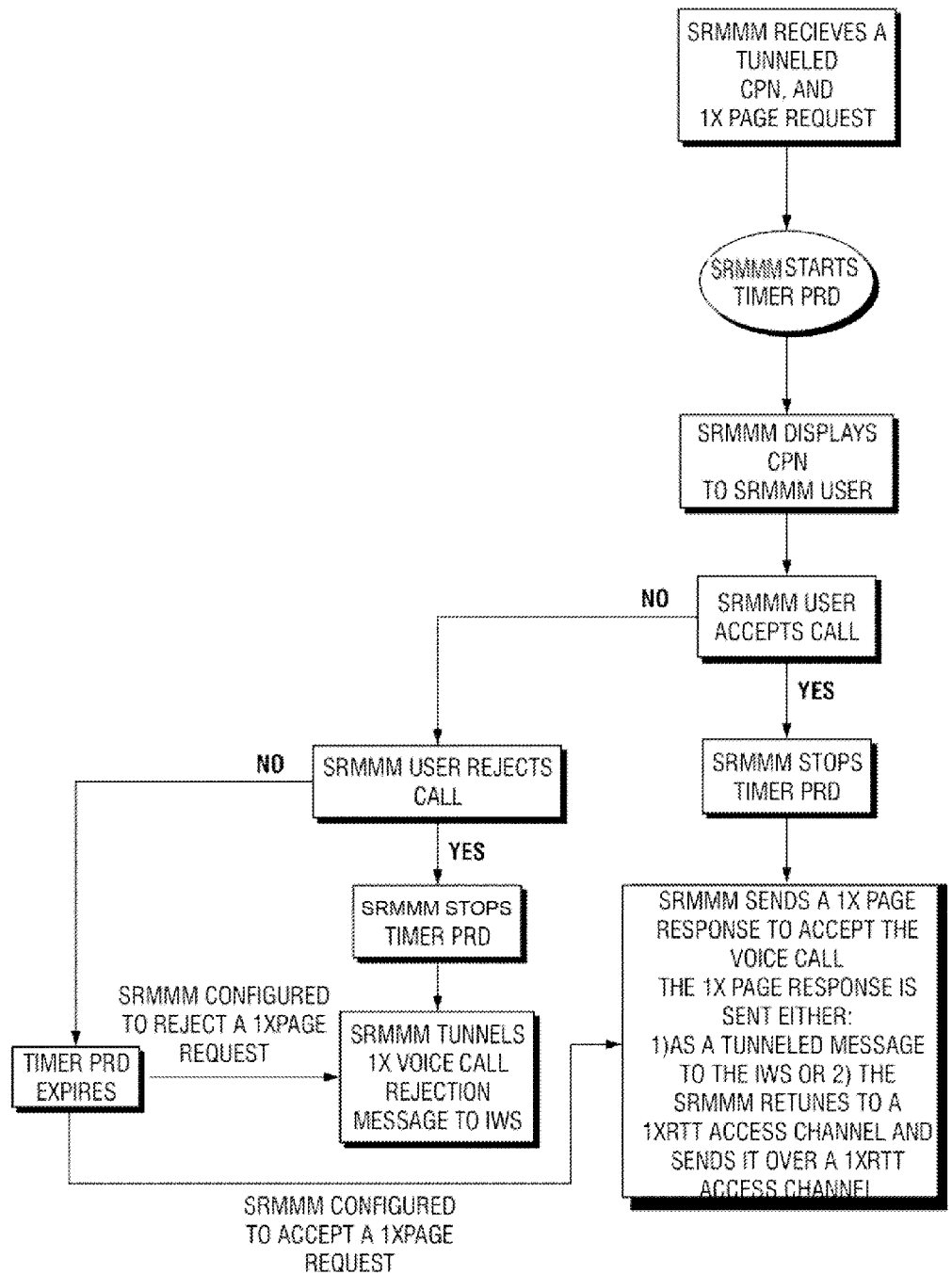
FIG. 4 is a flow chart regarding the operation of the present invention.

FIG. 4 is a flow chart regarding the operation of the present invention.
1) The invention does not waste 1× circuit-switched traffic channel resources for voice calls that will be rejected by the MS user.
2) For critical packet-data applications the user can decide whether to accept the 1× voice call and risk losing the packet-data session or whether the user can reject the 1× voice call ensuring the packet-data application is uninterrupted.

Abbreviations
BSC: Base Station Controller
CPN: Calling Party Number
GCSNA: Generic Circuit Services Notification Application
HRPD: High Rate Packet Data
IWS: Interworking Solution
LTE: Long Term Evolution
MS: Mobile Station
MSC: Mobile Switching Center
PSTN: Public Switched Telephone network
RAT: Radio Access Technology
SRMMM: Single Radio Multi-mode Mobile Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A single radio multimode mobile (SRMMM) of a circuit-switched radio access technology (RAT) network and a packet data radio access technology (RAT) network comprising:
   a network interface unit configured to receive a circuit-switched page request for a voice call with a calling party number while attached to the packet data RAT network through which an active packet data session is maintained;
   a timer;
   a processing unit in communication with a network interface unit configured to;
   start the timer when the network interface unit receives the circuit-switched page request,
   accept or reject the circuit-switched page request and stop the timer when the circuit-switched page request is accepted or rejected,
   cause the network interface unit to detach from the packet data RAT network to terminate the packet data session when the circuit-switched page request is accepted, and
   send a circuit-switched page response to accept the voice call when the circuit-switched page request is accepted; and
   a display on which the processing unit is configured to display the calling party number.

2. The SRMMM of claim 1 wherein the processing unit is configured to instruct the network interface unit to attach to the circuit-switched RAT network after the network interface unit detaches from the packet data RAT network.

3. The SRMMM of claim 1 wherein the processing unit is configured to cause the network interface unit to send a message to the circuit-switched RAT network indicating that the circuit-switched page request is rejected while remaining attached to the packet data RAT network and while the packet data session is maintained.

4. The SRMMM of claim 1 wherein the processing unit is configured to cause the network interface unit to send a message to the circuit-switched RAT network indicating that the circuit-switched page request is rejected after a predetermined period of time measured by the timer has expired and the processing unit has not accepted the circuit-switched page request.

5. The SRMMM of claim 1 wherein the processing unit is configured to cause the network interface to send a message to the circuit-switched RAT network indicating that the circuit-switched page request is accepted after a predetermined period of time measured by the timer has expired and the processing unit has accepted the circuit-switched page request.

6. A method of allowing a subscriber of a single radio multimode mobile (SRMMM) of a circuit-switched radio access technology (RAT) network and a packet data radio access technology (RAT) network to view a calling party number comprising the steps of:
   attaching a network interface unit to the packet data RAT network through which an active packet data session is maintained;
   receiving a circuit-switched page request for a voice call with a calling party number at and while the network interface unit is attached to the packet data RAT network and the active packet data session is maintained:
   employing a processing unit for:
      starting a timer when the network interface unit receives the circuit-switched page request,
      accepting or rejecting the circuit-switched page request and stopping the timer when the circuit-switched page request is accepted or rejected,
      causing the network interface unit to detach from the packet data RAT network to suspend the packet data session when the circuit-switched page request is accepted, and
      sending a circuit-switched page response to accept the voice call when the circuit-switched page request is accepted; and
   displaying on a display the calling party number by the processing unit.

7. The method of claim 6 including the step of the processing unit instructing the network interface to attach to the circuit-switched RAT network after the network interface unit detaches from the packet data RAT network.

8. The method of claim 6 including the step of the processing unit causing the network interface unit to send a message to the circuit-switched RAT network indicating that the circuit-switched page request is rejected while remaining attached to the packet data RAT network and while the packet data session is maintained.

9. The method of claim 6 including the steps of the processing unit causing the network interface to send a message to the circuit-switched RAT network indicating that the circuit-switched page request is rejected after a predetermined period of time measured by the timer has expired and the processing unit has not accepted the circuit-switched page request.

10. The method of claim 6 including the steps of the processing unit causing the network interface to send a message to the circuit-switched RAT network indicating that the circuit-switched page request is accepted after a predetermined period of time measured by the timer has expired and the processing unit has accepted the circuit-switched page request.

* * * * *

UNITED STATES PATENT AND TRADEMARK OFFICE
CERTIFICATE OF CORRECTION

PATENT NO. : 8,693,396 B2  Page 1 of 1
APPLICATION NO. : 13/152798
DATED : April 8, 2014
INVENTOR(S) : Jang et al.

It is certified that error appears in the above-identified patent and that said Letters Patent is hereby corrected as shown below:

In the Specification

In Column 1, Line 31, delete "request:" and insert -- request. --, therefor.

In Column 2, Line 66, delete "a:" and insert -- a --, therefor.

In Column 3, Line 9, delete "will: stay" and insert -- will stay --, therefor.

In Column 3, Line 46, delete "request," and insert -- request --, therefor.

In Column 4, Line 44, delete "tinier 18" and insert -- timer 18 --, therefor.

In Column 4, Line 50, delete "switched." and insert -- switched --, therefor.

In Column 5, Line 5, delete "interface," and insert -- interface --, therefor.

Signed and Sealed this
Eleventh Day of November, 2014

Michelle K. Lee
*Deputy Director of the United States Patent and Trademark Office*